United States Patent
Gustafsson et al.

(10) Patent No.: US 6,385,262 B1
(45) Date of Patent: May 7, 2002

(54) METHOD AND APPARATUS FOR CHANGING THE CHANNEL BANDWIDTH THAT IS RECEIVABLE IN A RADIO RECEIVER

(75) Inventors: Kjell B. Gustafsson, Lund; Björn M. G. Lindquist, Bjärred, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/221,398

(22) Filed: Dec. 28, 1998

(30) Foreign Application Priority Data

Dec. 29, 1997 (SE) .............................. 9704896-1

(51) Int. Cl.⁷ .............................. H04Q 7/14; H01P 1/20
(52) U.S. Cl. .................. 375/350; 375/327; 375/332; 375/347; 455/143; 455/150.1
(58) Field of Search ................. 375/279, 281, 375/316, 329, 330, 331, 332, 344, 350, 355, 144, 148, 267, 324–328, 347; 329/304; 455/511, 132, 140, 142, 143, 144, 150.1, 160.1, 266

(56) References Cited

U.S. PATENT DOCUMENTS

| | | | | |
|---|---|---|---|---|
| 5,008,925 A | | 4/1991 | Pireh ........................... 379/60 |
| 5,020,093 A | | 5/1991 | Pireh ........................... 379/59 |
| 5,257,401 A | | 10/1993 | Dahlin et al. .............. 455/33.2 |
| 5,841,814 A | * | 11/1998 | Cupo ......................... 375/321 |
| 5,930,288 A | * | 7/1999 | Eberhardt ................... 375/148 |
| 6,009,132 A | * | 12/1999 | Scholtz ....................... 375/355 |
| 6,058,148 A | * | 5/2000 | Whikehart et al. ......... 375/350 |
| 6,167,095 A | * | 12/2000 | Furukawa et al. .......... 375/285 |
| 6,195,383 B1 | * | 2/2001 | Wishart et al. ............. 375/136 |
| 6,208,671 B1 | * | 3/2001 | Paulos et al. ............... 370/545 |
| 6,236,263 B1 | * | 5/2001 | Iwamatsu .................... 329/306 |

FOREIGN PATENT DOCUMENTS

EP 0678974 10/1995

OTHER PUBLICATIONS

Beckman, T.; International–Type Search Report; Sep. 23, 1998 Search Request No. SE 97/01610; pp. 1–4.

* cited by examiner

Primary Examiner—Young T. Tse
(74) Attorney, Agent, or Firm—Jenkens & Gilchrist, P.C.

(57) ABSTRACT

The present invention relates to an arrangement (1) and a method in a receiver in a multi-mode mobile radio (m), wherein the intention is to design the receiver so that it uses the same hardware to process several different channel bandwidths corresponding to the different networks used by the radio (m). This is done by changing a sampling frequency ($f_s$) which controls a digital filter unit (25) situated in the digital part of the receiver. The changing of the sampling frequency ($f_s$) results in that the bandwidth of the digital filter unit (25) is scaled accordingly, wherein the desired channel bandwidth at baseband of the radio network (GSM1900, AMPS) to be used by the radio (m) is selected in the digital filter unit (25). As a complement, the digital filter unit (25) can be implemented with a programmable function, where a change of parameters and/or filter structure inside the digital filter unit (25) can be used to adjust the filter bandwidth.

21 Claims, 4 Drawing Sheets

METHOD AND APPARATUS FOR CHANGING THE CHANNEL BANDWIDTH THAT IS RECEIVABLE IN A RADIO RECEIVER

TECHNICAL FIELD OF THE INVENTION

The present invention relates to a method and an arrangement for a receiver in a multi-mode mobile radio, which is adapted to be used in different radio communication networks (e.g. GSM, AMPS).

BACKGROUND

According to prior art a multi-mode radio mobile telephone, also called a multi-mode phone, is a radio mobile phone adapted to be used in several different cellular radio telephone communication networks, also called cellular networks, which utilises different frequency bands. Examples of cellular networks are AMPS, D-AMPS, GSM, DCS1800, GSM1900, IS-95, NMT and DECT. The different frequency bands result in that the different cellular networks have different carrier frequencies which are used in the communication between the multi-mode phone and the cellular network.

An advantage with the multi-mode phone is that the phone can choose the cellular network which at the present moment has the best radio coverage area and which has the best signal quality. The user of the multi-mode phone can then move from a office network like DECT inside a building to an area outside which is covered by another cellular network. The multi-mode phone is a very good alternative in areas with large traffic density, where an extra cellular network can be used as a complement to an already existing cellular network to increase the capacity.

The receiver in a cellular phone is implemented differently for different cellular networks so, according to prior art, one method to construct a multi-mode phone is to implement separate receivers in the multi-mode phone for the different cellular networks.

A problem with this method is that the separate receivers take big space in the mobile phone, more electronic components are included in the mobile phone and therefore the phone becomes more expensive and weighs more.

The receiver in a radio mobile telephone reconstructs the modulating signal related to the incoming radio frequency signal in the antenna of the radio mobile telephone. The receiver rejects unwanted signals and amplifies the wanted incoming radio frequency signal in a background of noise that lay in the same channel bandwidth as the incoming radio frequency signal. This is well known to the person skilled in the art.

In a traditional receiver, the incoming radio frequency signal is translated in frequency to an intermediate frequency (IF) or a baseband frequency signal where the relevant information is recovered by some demodulation means.

The demodulation signal processing in the receiver of the incoming radio frequency signal is traditionally done by analog circuits (for example an FM discriminator), but today digital circuits are also being used for demodulation, for example in a receiver of a heterodyne structure or a homodyne structure (also called a direct conversion structure). Because of the demand for significant increases in traffic capacity over the same frequency spectrum currently used in cellular networks, requirements for lower cost operation, and additional mobile telephone features, such as battery-saving capabilities, a transition is being made today from analog to digital communication in cellular networks.

For analog cellular networks, like AMPS, ETACS, and NMT, the receiver in a radio mobile telephone is most commonly implemented as a superheterodyne structure. The superheterodyne receiver mixes down an incoming radio frequency signal to an intermediate frequency band and thereafter down to a second lower intermediate frequency. In this receiver, the channel bandwidth selection is made in the intermediate frequency bands with SAW and/or ceramic bandpass filters having a fixed bandwidth.

For digital cellular networks, like GSM, GSM1900, and D-AMPS, the receiver in a radio mobile telephone is normally implemented in a different way, where the receiver uses a lot of digital processing of the incoming signal. This is briefly described below.

This digital cellular network receiver is normally of a heterodyne structure, but could also be of a homodyne structure, which have the same basic principles.

The homodyne receiver mixes down an incoming radio frequency signal in the radio mobile telephone immediately to two baseband channels in quadrature (I and Q).

The heterodyne receiver mixes down the incoming radio frequency signal to an intermediate frequency band before mixing down to two baseband channels in quadrature. The receiver can mix down the incoming signal in several steps before mixing down to the two baseband channels in quadrature. The channel bandwidth selection could be made in three different places; in a bandpass filter at the intermediate frequency, in low-pass filters on the analog baseband signals, and in digital low-pass filters operating on the digitized baseband signals. Digital filtering is of course only possible if the sampling ratio is much higher than the Nyquist sampling frequency (twice the channel bandwidth).

The well known characteristics of a digital filter, is that it is only related to a sampling frequency and not to certain frequency characteristics. If the sampling frequency is changed, then the frequency characteristics of the filter will be scaled accordingly. So for example, if the sampling frequency is changed to half its value, then the bandwidth of the digital filter will be scaled to half its original value.

The patent application EP 678,974 describes a dual frequency transmitter or receiver in a portable phone, in which the receiver includes a circuit switch which switches the antenna in the phone between two frequency front-end parts depending on which frequency network is used. The transmitter or receiver uses two different oscillator frequencies to handle radio signals from both frequency networks at one intermediate frequency. The channel bandwidth remains the same for the two operating frequency networks and thus the channel filtering is the same for the different frequency networks.

The patents U.S. Pat. Nos. 5,008,925, 4,972,455, 5,020,093 and 5,020,092 describe dual channel bandwidth receivers designed for the networks AMPS and N-AMPS (narrow band AMPS) applications where the channel bandwidths are 30 kHz and 10 kHz, respectively. There are two different ceramic channel filters on a second intermediate frequency with different bandwidth. The channel bandwidth is chosen by a switch that connects the signal through one of these filters depending on which network is to be used.

A problem with this solution is that it adds a lot of analog components, such as ceramic filters, which are relatively expensive and not possible to integrate in silicon.

The U.S. Pat. No. 5,369,785 describes an invention that relates to the detection of a signalling tone in a cellular network. A bandpass filter is used for the detection and the center frequency of the bandpass filter is set to the frequency of interest by varying the frequency of an external clock. The actual bandwidth of the filter is not related to the clock frequency.

SUMMARY OF THE INVENTION

The problem dealt with by the present invention is to design a receiver in a multi-mode mobile radio that uses the same hardware to process several different channel bandwidths.

Another problem dealt with by the present invention is to design a receiver in a multi-mode mobile radio that uses the same hardware but with some programming of a digital part of the receiver to process several different channel bandwidths.

One intention of the invention is consequently to design a receiver in a multi-mode mobile radio that uses the same hardware or that uses the same hardware but with some programming of the digital part of the receiver to process several different channel bandwidths.

The problem is solved essentially by changing a sampling frequency which controls both analog to digital converters and a digital filter unit in the digital part of the receiver. Thereby different frequency bandwidths can be processed in the same hardware.

The digital filter unit could for most radio communication networks remain constant (i.e. the same filter coefficients and the same filter structure can be used in the digital filter unit) because of the fact that the specified filtering requirements on the adjacent channels are basically the same for all networks. Thus, even for radio communication networks with different channel bandwidths, the specified requirement for the adjacent channel is in the same order.

In some cases, however, the digital filter unit can be modified to a different filter function for adjusting the channel bandwidth of the digital filter unit, as a complement to changing the sampling frequency for achieving a more optimum performance on adjacent channel rejection.

More specifically, the problem is solved in the following manner. An analog part of the receiver in the multi-mode mobile radio is kept the same. There is an exception where the receiver front-end parts (comprising for example low noise amplifier, bandpass filter and/or mixers) are different, if the different networks used by the multi-mode mobile radio operates in different frequency bands.

The channel bandwidth selection is made in the digital part of the receiver by the digital filter unit. By changing the sampling frequency that controls the A/D-converters and the digital filter unit, different channel bandwidths of the receiver are accomplished. The changing of the sampling frequency results in that the bandwidth of the digital filter unit is scaled accordingly. Thereby the desired channel bandwidth at baseband of the radio communication network to be used by the multi-mode mobile radio is set by choosing a corresponding sampling frequency.

As a complement, the digital filter unit can be implemented with a programmable filter function, which programmable filter function comprises a change of parameters and/or filter structure inside the digital filter unit. That is, first the sampling frequency that controls the digital filter unit is changed, resulting in a corresponding change in the bandwidth of the digital filter unit, and then the programmability of the digital filter unit is used to fine tune the filter unit properties. This results in that the desired channel bandwidth of the network to be used by the multi-mode mobile radio is selected in the digital filter unit.

One advantage offered by the invention is that the same components in the receiver are reused. The analog part remains exactly the same in the receiver, except for the fixed frond-end parts in case of several radio communication networks operating in different frequency bands. No modifications of expensive analog components have to be done in the receiver. In some cases a minor modification of the digital filter unit is done, but that is cheap and simple.

Another advantage is that the invention is simple to use in practice as the selection of one of the radio communication networks is made in the digital part of the receiver.

Still another advantage is that the receiver is compact as digital components are compact.

Yet other advantages are that the receiver obtain a low weight as well as low cost.

The invention will now be described in more detail with reference to exemplifying embodiments thereof and also with reference to the accompany drawings.

DETAILED DESCRIPTION OF THE EMBODIMENTS

Figure 1:
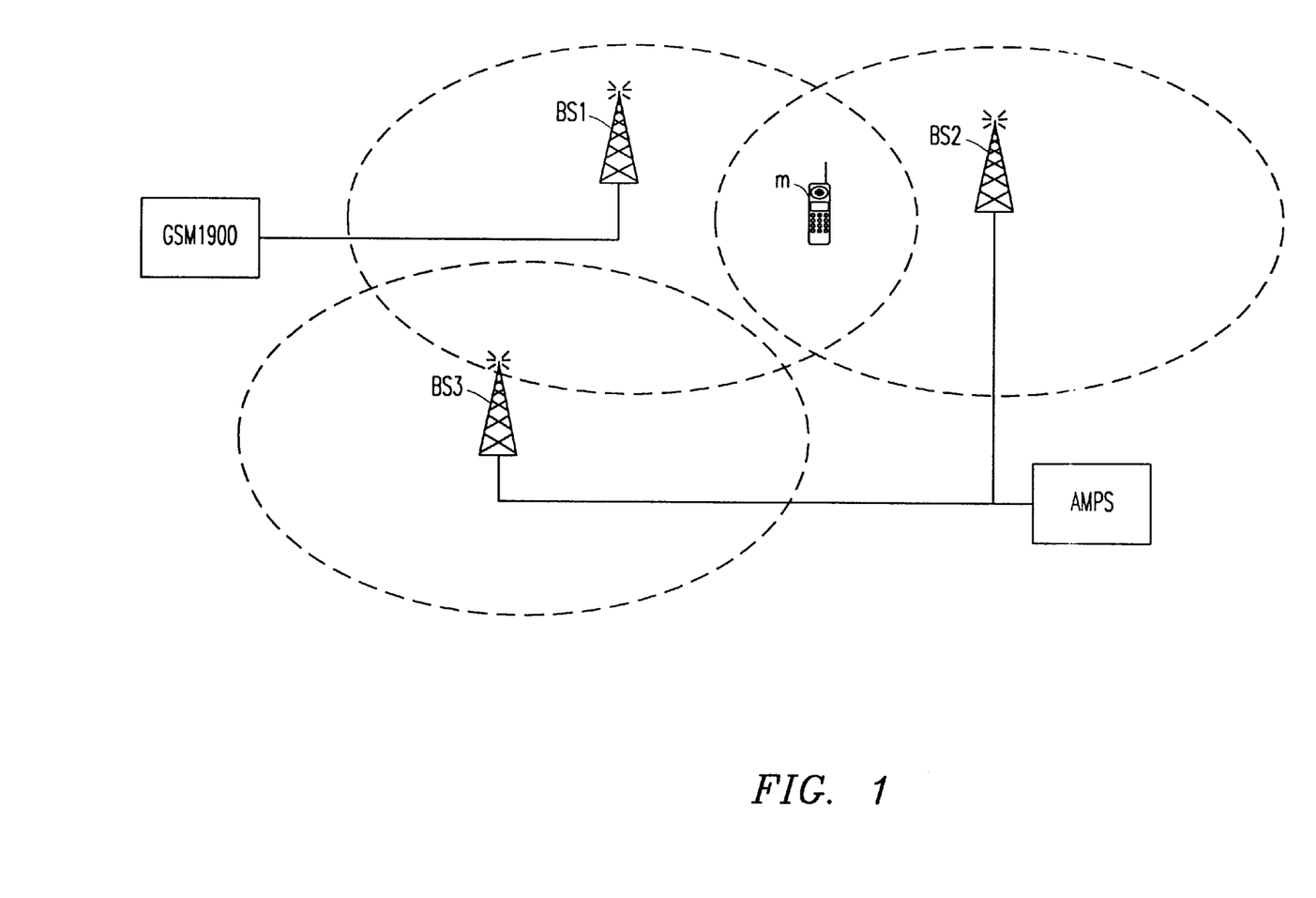
FIG. 1 is a schematic view of an exemplary communication network comprising different cellular networks, according to the invention.

FIG. 1 illustrates a schematic view of an exemplary communication network comprising two different cellular radio telephone communication networks, also called cellular networks. A first base station BS1 is connected to a cellular network GSM1900, and a second base station BS2 and a third base station BS3 are connected to a cellular network AMPS.

A multi-mode radio mobile telephone m, also called multi-mode phone, as shown in FIG. 1 can be used for communication in the cellular network GSM1900 and in the cellular network AMPS.

The multi-mode phone m is not limited to be used in the two cellular networks GSM1900 and AMPS. Other cellular networks, for example GSM, NMT, IS-95, can also be used by the multi-mode phone m, if supported by the phone.

One embodiment of the invention is described below in connection with FIG. 2a.

Figure 2A:
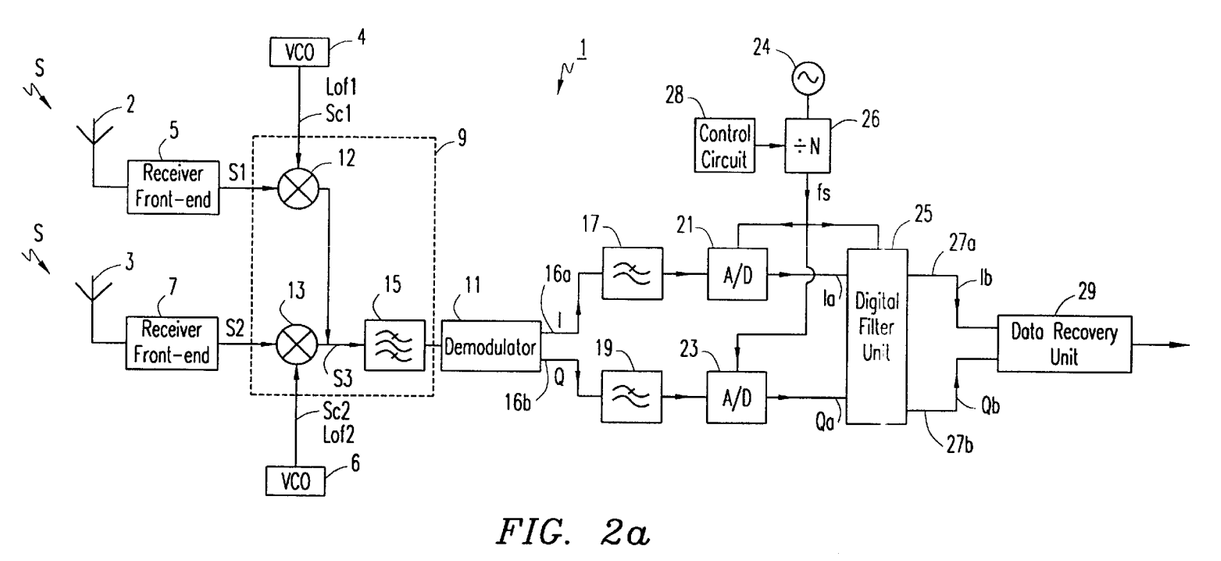
FIG. 2a is an exemplary block schematic illustrating a multi band heterodyne receiver arrangement according to the invention.

FIG. 2a shows a schematic figure of a receiver arrangement 1 in the multi-mode phone m.

The invention is of course not limited to be used in only two different cellular networks, but for simplicity the invention is described to be used in only two different cellular networks in this example.

The receiver arrangement 1 in FIG. 2a is designed to be used in a first cellular network, for example GSM1900. Then by using a second receiver front-end part and by changing a sampling frequency that controls both analog to digital converters, also called A/D-converters, and a digital filter unit in the receiver arrangement 1, the same receiver arrangement 1 can be used in a second cellular network, for example AMPS. This is described in more detail below.

It is assumed in this example that the first cellular network and the second cellular network have similar requirements on the suppression of adjacent channels, and that the networks operate in different frequency bands, thus this description is for a dual mode, dual band phone.

The receiver arrangement 1 comprises two antennas 2, 3, and a receiver which comprises an analog part and a digital part. The receiver is of a heterodyne structure as described above, but the invention works as well for a receiver of a homodyne structure also described above. The antennas 2 and 3 could also for some applications be combined into one antenna tuned for dual band operation.

The analog part of the receiver comprises a first front-end part 5, a second front-end part 7, an intermediate frequency (IF) part 9, an I/Q-demodulator 11, two analog filters 17, 19, and two A/D-converters 21, 23, as shown in FIG. 2a.

The first front-end part 5 and the second front-end part 7 each correspond to one of the cellular networks used by the multi-mode phone m, as the cellular networks operate in different frequency bands. In this example it is assumed that the first front-end part 5 of the analog part of the receiver corresponds to the first cellular network GSM1900 and the second front-end part 7 corresponds to the second cellular network AMPS. Normally the receiver front-end part consists of a bandpass filter and a low noise amplifier.

Figure 4:
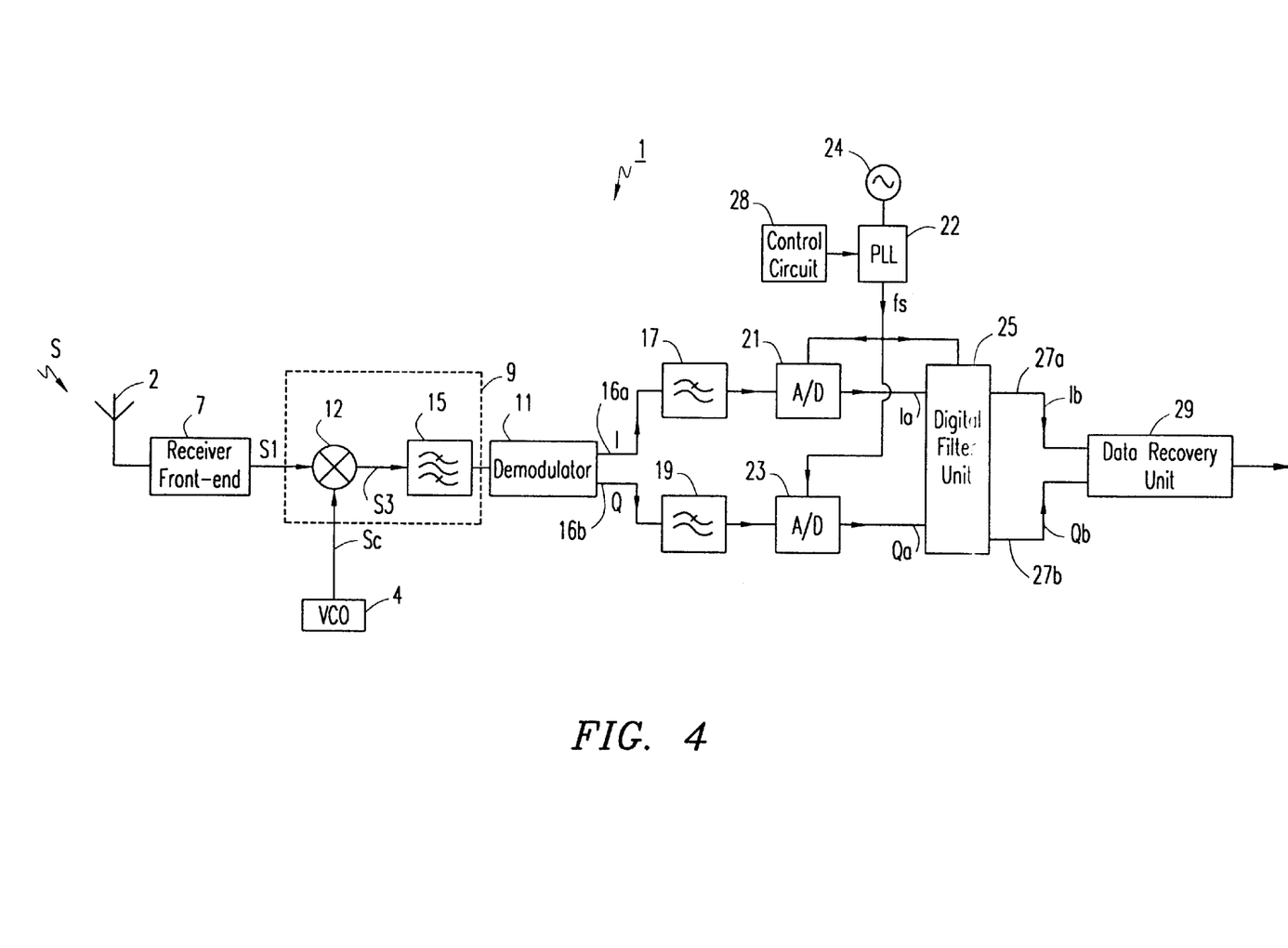
FIG. 4 is an exemplary block schematic illustrating a heterodyne receiver arrangement operating in two different cellular networks with different channel bandwidths, but in the same band according to the invention.

In a case where the first and the second cellular networks are operating in the same frequency band, they can share the same front-end part. The analog part of the receiver will in this case comprise one front-end part as shown in FIG. 4.

The antennas 2, 3 are respectively connected to the first front-end part 5 and the second front-end part 7. The antennas could also as earlier stated be combined into one antenna from which the signal is split up into the two front-end parts 5, 7.

Depending on what network is used by the multi-mode phone m one of the antennas 2, 3 receives an incoming signal, represented by S, containing different frequencies, wherein at least a part of the information in the signal S may be digital information.

The multi-mode phone m changes between the different networks that can be used by the phone m either in a manual manner or it is done automatically when the multi-mode phone m is located in a preferred network.

The antennas 2, 3 receive an incoming signal, represented by S, containing different frequencies. The first front-end part 5 and the second front-end part 7 comprise components which amplify signals in the wanted frequency band and block all the frequencies outside the frequency band corresponding to the first cellular network and the second cellular network, respectively. Depending on what cellular network is being used by the multi-mode phone m, frequencies of the signal S inside the respective frequency band are amplified and frequencies outside the respective frequency band are blocked.

A signal $S_1$, after the first front-end part 5, or a signal $S_2$ after the second front-end part 7, therefore contains frequencies within a first frequency band corresponding to the frequency band of the cellular network being used by the multi-mode phone m.

The intermediate frequency part 9 in the analog part of the receiver comprise a first mixer 12, a second mixer 13 and an intermediate bandpass filter 15.

The first and the second front-end parts 5, 7 are respectively connected to the first mixer 12 and the second mixer 13, and the mixers 12, 13 are in turn connected to the bandpass filter 15 as shown in FIG. 2a.

The filtered signal $S_1$, $S_2$ from the front-end part 5, 7 corresponding to the cellular network being used by the multi-mode phone m, is received in the corresponding mixer 12, 13, which mixes this signal with a corresponding first local oscillator signal $S_{c1}$ or a corresponding second local oscillator signal $S_{c2}$.

The first local oscillator signal $Sc_2$ corresponding to the first mixer 12 has a frequency $LoF_1$ and the second local oscillator signal $S_{c2}$ corresponding to the second mixer 13 has a frequency of $LoF_2$. The first local oscillator signal $S_{c1}$, and the second local oscillator signal $S_{c2}$ are generated by VCOs (Voltage Control Oscillators) 4 and 6, respectively. Thereby the output from the first mixer 12 or the second mixer 13 is a signal $S_3$ in an intermediate frequency band which is of the same frequency if the signal is taken from the first mixer 12 or the second mixer 13.

Thus, independent of the frequency band of the incoming signal S to one of the antennas 2, 3, the generated wanted signal $S_3$ from the first mixer 12 or the second mixer 13 always lay mainly within the same intermediate frequency band. This is done according to prior art technology by varying the VCO frequency $Lof_1$ or $Lof_2$ so that the signal $S_3$ is generated by the first mixer 12 or the second mixer 13 within the same intermediate frequency band.

The intermediate bandpass filter 15 attenuates all the unwanted frequencies in the signal $S_3$ from the first mixer 12 or the second mixer 13 except for the intermediate frequencies in a wanted second frequency band. This intermediate bandpass filter band width is fixed and narrower than the first frequency band described above, but still wide enough to accommodate the largest channel bandwidth of the received cellular networks.

The bandpass filter 15 is connected to the I/Q-demodulator 11.

The I/Q-demodulator 11 generates a signal I in the baseband corresponding to the cellular network being used by the multi-mode phone m on a first output 16a and a signal Q is generated in the baseband corresponding to the cellular network being used by the multi-mode phone m on a second output 16b as shown in FIG. 2a.

The signals I and Q are two baseband channels in quadrature. The above described I/Q-demodulation is well known to someone skilled in the art.

Each one of the outputs 16a and 16b of the I/Q-demodulator 11 is connected to a respective analog filter 17 or 19, and each one of the analog filters is connected to a respective A/D-converter 21 or 23, see FIG. 2a.

The signals I and Q from the I/Q-demodulation are each filtered in the separate analog filters 17, 19 (anti-aliasing filters) to avoid aliasing of the signals in the A/D converter sampling process, and after the analog filters 17, 19 the signals I and Q are each converted to a digital signal in the separate A/D converters 21, 23.

The digital part of the receiver comprises a digital filter unit 25. The digital part of the receiver can comprise further components, but they are not shown in FIG. 2a.

Each one of the A/D-converters 21, 23 in the analog part of the receiver is connected to the digital filter unit 25 as shown in FIG. 2a.

The digital filter unit 25 and the A/D-converters 21, 23 are controlled by a sampling frequency $f_s$. This sampling frequency $f_s$ is in one embodiment generated by an oscillator 24 and a programmable divider 26. The sampling frequency $f_s$ could also be generated with a reference clock and a PLL structure, but in this example the sampling frequency $f_s$ is generated by the oscillator 24 and the programmable divider 26. The oscillator 24 is in the present example an ordinary crystal oscillator with fixed frequency.

A control circuit 28, connected to the divider 26, controls the sampling frequency $f_s$ by controlling the division factor N in the divider 26.

Figure 2B:
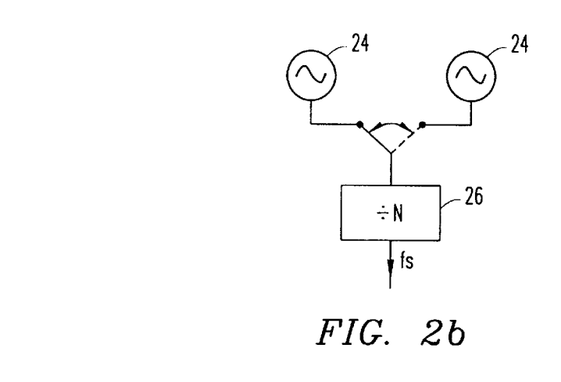

As shown in FIG. 2b, an alternative two different oscillators with fixed frequencies can be used, wherein the changing of the sampling frequency ($f_s$) is done by switching between the oscillators. This is not further described here.

The frequency characteristics of a digital filter unit is related to the sampling frequency ($f_s$) which is well known in prior art. If the sampling frequency $f_s$ is changed, then the filter characteristics of the digital filter unit 25 will be scaled accordingly. The bandwidth of the digital filter unit is proportional to the sampling frequency $f_s$ so for example, if the sampling frequency $f_s$ is changed to half its value, the actual frequency bandwidth of the digital filter unit will be scaled to half its original value.

The selection of the wanted information i.e. radio channel with a specific bandwidth in the signal S, which is based on the requirements of the channel bandwidth of the cellular network being used by the multi-mode phone m, is made in the digital filter unit 25 in the digital part of the receiver. This is done by changing the sampling frequency $f_s$ through the control circuit 28 described above, so that the digital filter unit 25 obtains a bandwidth equal to the required channel bandwidth. The change in sampling frequency $f_s$ is achieved by letting the control circuit 28 change divider value in the divider 26.

Signals $I_a$, $Q_s$, from the A/D-converters 21, 23 passes through the digital filter unit 25, wherein two channel signals $I_b$, $Q_b$ in quadrature are generated on two outputs 27a, 27b of the digital filter unit 25. The two channel signals $I_b$, $Q_b$ contain frequencies from zero up to a certain frequency corresponding to the wanted channel bandwidth at baseband for the specified cellular network being used.

The relevant information in the signal S received by the antenna 2, 3 has as described above a bandwidth equal to the channel bandwidth at baseband for the specified cellular network being used, and this bandwidth determines the bandwidth of the digital filter unit 25.

After the digital filter unit 25, the two channel signals $I_b$, $Q_b$ pass on to a data recovery unit 29, wherein relevant information from the channel signals $I_b$, $Q_b$ is reconstructed.

An example in association with the above described embodiment and FIG. 2a is given below.

In this example the first cellular network corresponds to the digital cellular network GSM1900 (based on GSM) and the second cellular network corresponds to the analog cellular network AMPS, which networks have similar requirements on the suppression of adjacent channels.

The GSM1900 mobile receiver operates in the 1900 MHz frequency band between 1930 and 1990 MHz and the AMPS mobile receiver operates in the 800 MHz frequency band between 869 and 894 MHz.

The requirements for the GSM1900 mobile receiver is to have a 90 kHz bandwidth at baseband (slightly less than half the GSM1900 channel separation 200 kHz) and the requirements for the AMPS mobile receiver is to have a 13.5 kHz bandwidth at baseband (AMPS channel separation is 30 kHz).

As the networks GSM1900 and AMPS operate in different frequency bands, the analog part of the receiver comprises the two different front-end parts 5 and 7, one for each network, as described in the above embodiment.

It is assumed in this example that the network GSM1900 requires a front-end part like the first front-end part 5 described above, and that the network AMPS requires a front-end part like the second front-end part 7 described above.

In this example it is also assumed that the receiver arrangement 1 is designed to handle the cellular network GSM1900, wherein the sampling frequency $f_s$ that controls the digital filter unit 25 in the digital part of the receiver is changed so that the bandwidth of the digital filter unit 25 is equal to the required channel bandwidth at baseband of the network GSM1900, which is equal to 90 kHz.

The antenna 2 in FIG. 2a, according to the above described embodiment, receives the incoming signal S containing relevant information with different frequencies, and then the first front-end part 5 cuts off all the frequencies outside the frequency band corresponding to the GSM1900 mobile receive band, which is 1930–1990 MHz.

The filtered signal S1 from the first front-end part 5 is received in the intermediate frequency part 9 and is further delivered into the first mixer 12. The first mixer 12 then mixes this signal with the above described first local oscillator signal $S_1$, wherein the first mixer 12 generates the signal $S_3$ in an intermediate frequency band. In this mode the second front-end part 7 related to antenna 3 is switched off, and the signal $S_3$ originates solely from antenna 2.

The bandpass filter 15 in the intermediate frequency part 9 has a fixed filter bandwidth of roughly 200 kHz and cuts off all the intermediate frequencies in the signal $S_3$ from the first mixer 12 except for the intermediate frequency in a wanted second frequency band. The bandpass filter 15 reduces the power of signals outside the channel of interest and thereby performs some of the channel filtering. The remaining channel filtering is handled in the digital filter unit 25.

The I/Q-demodulator 11 receives the signal in the second frequency band and the I/Q-demodulator 11 then generates a signal I in the baseband of the network GSM1900 on the first output 16a and a signal Q is generated in the baseband of the network GSM1900 on the second output 16b.

Each signal I, Q is filtered in the separate analog filters 17, 19. After the analog filters 17, 19 the signals I and Q are sampled with in this case a 13 MHz sampling clock and then each digitally converted into the signals $I_a$ and $Q_a$ in the separate A/D-converters 21, 23, as shown in FIG. 2a. The 13 MHz sampling clock is generated by having an oscillator 24 at 39 MHz and dividing by N=3 in the programmable divider 26.

Then the signals $I_a$ and $Q_a$ are treated in the digital filter unit 25, wherein two channel signals $I_b$ and $Q_b$ in quadrature are generated on the two outputs 27a, 27b of the digital filter unit 25. After the digital filter the two channel signals $I_b$ and $Q_b$ contain frequencies from zero up to 90 kHz, which corresponds to the wanted channel bandwidth at baseband for the network GSM1900.

After the digital filter unit 25 the two channel signals $I_b$ and $Q_b$ are passed on to the data recovery unit 29, wherein relevant information from the channel signals $I_b$ and $Q_b$ are reconstructed.

Now let the receiver arrangement 1 related to antenna 3 and the second front-end part 7 in FIG. 2a be used in the network AMPS.

The receiver arrangement 1 is switched to be used from the network GSM1900 to the network AMPS by manually switching between the networks or it is done automatically in the receiver arrangement 1 when the multi-mode phone m is used in the network AMPS.

The switching between the networks will affect the control circuit 28 to change the sampling frequency $f_s$ that controls the digital filter unit 25. In the present case the sampling frequency $f_s$ is decreased by a factor $6\frac{2}{3} \approx 6.67$. This will also change the bandwidth of the digital filter unit 25 by a factor 6.67 as described above. The bandwidth of the digital filter unit 25 thus equals 90/6.67 kHz≈13.5 kHz which is equal to the required channel bandwidth at baseband of the network AMPS.

Then the antenna 3 in FIG. 2a, according to the above described embodiment, receives the incoming signal S containing different frequencies, and the second front-end part 7 cuts off all the frequencies outside the frequency band corresponding to the network AMPS, which is 869–894 MHz.

The filtered signal $S_2$ from the second front-end part 7 is received in the intermediate frequency part 9 and is further delivered into the second mixer 13. The second mixer 13 then mixes this signal with the second local oscillator signal $S_{c2}$, wherein the second mixer 13 generates the signal $S_3$ in an intermediate frequency band. In this mode the first front-end part 5 related to antenna 2 is switched off, and the signal $S_3$ originates solely from antenna 3.

The bandpass filter 15 in the intermediate frequency part 9 cuts off all the intermediate frequencies in the signal $S_3$ from the second mixer 13 except for the intermediate frequencies in a 200 kHz wide second frequency band. Since the bandpass filter 15 has a fixed bandwidth which is chosen for the wider GSM1900 channel bandwidth, this filter is not optimal for AMPS. It will in this case pass through the wanted AMPS channel frequency band as well as adjacent channels in AMPS. These unwanted channels have to be filtered out later in the digital filter unit 25.

Thereafter the I/Q-demodulator 11 receives the signal in the second frequency band and the I/Q-demodulator 11 then generates an AMPS baseband signal I on the first output 16a and an AMPS baseband signal Q on the second output 16b. Both baseband signals also contain adjacent channel interference which has passed through the 200 kHz bandwidth of the bandpass filter 15.

The signals I and Q from the I/Q-demodulation is filtered in separate analog filters 17, 19 and after the analog, filters 17, 19 the signals I and Q are each digitally converted into the signals $I_a$ and $Q_a$ in the separate A/D-converters 21, 23, as shown in FIG. 2a.

The sampling frequency $f_s$ that controls the A/D sampling rate and the digital filter unit 25 is in this AMPS case as described above decreased by a factor 6.67, wherein the sampling frequency $f_s$ in this case equals 13 MHz/6.67=1.95 MHz. This is achieved by having the control circuit 28 make the divider 26 divide by N=20 instead of N=3 as in the GSM1900 case.

This will as described above change the bandwidth of the digital filter unit 25 by a factor 6.67. The bandwidth of the digital filter unit 25 thus equals 90/6.67 kHz≈13.5 kHz.

Then the signals $I_a$ and $Q_a$ are treated in the digital filter unit 25, wherein two channel signals $I_b$ and $Q_b$ in quadrature are generated on the two outputs 27a, 27b of the digital filter unit 25. The two channel signals $I_b$ and $Q_b$ contain frequencies from zero up to 13.5 kHz, which corresponds to the wanted channel bandwidth at baseband for the network AMPS.

After the digital filter unit 25, the two channel signals $I_b$ and $Q_b$ are passed on to the data recovery unit 29, wherein relevant information from the channel signals $I_b$ and $Q_b$ are reconstructed.

The digital filter unit 25 in the digital part of the receiver is designed for the cellular network which demands the most adjacent channel suppression in case the requirements are different for the two cellular networks being used by the multi-mode phone m.

The analog filters 17, 19 in the analog part of the receiver are designed for sufficient anti-aliasing filtering at the lowest sampling frequency to be used in the receiver and with a passband large enough to not distort the signal with the largest channel bandwidth at baseband for the cellular networks being used by the multi-mode phone m.

When the multi-mode phone m changes back to use the cellular network GSM1900, the control circuit 28 in this embodiment changes the division factor N in the divider 26 back to 3 and thus increases the sampling frequency $f_s$ by a factor 6.67 so that a bandwidth of the digital filter unit 25 of about 90 kHz (13.5 kHz×6.67≈90 kHz) is obtained, which is equal to the required channel bandwidth at baseband of the network GSM1900.

The digital filter unit 25 can be implemented in many ways. The chosen structures depend on both the cellular networks in question as well as the chosen implementation technology. The implementation described here should be seen as an example of the basic idea rather than a definitive choice for all situations. For a person skilled in the art it is obvious how the presented solution can be generalized and varied.

Figure 3A:
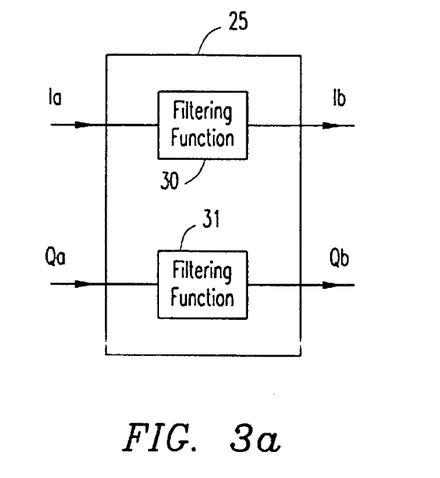
FIGS. 3a, 3b, 3c are exemplary block schematics illustrating a digital filter unit according to the invention.

FIG. 3a depicts a block diagram of the digital filter unit 25. The two signals $I_a$ and $Q_a$ are filtered in two identical filtering function blocks 30 and 31, which generates $I_b$ and $Q_b$. These two blocks could either be physically separate units or one single unit which is time multiplexed between the signals $I_a$ and $Q_a$. The time multiplexed solution reduces the digital hardware by a factor of 2 at the price of twice as fast digital signal processing.

Figure 3B:
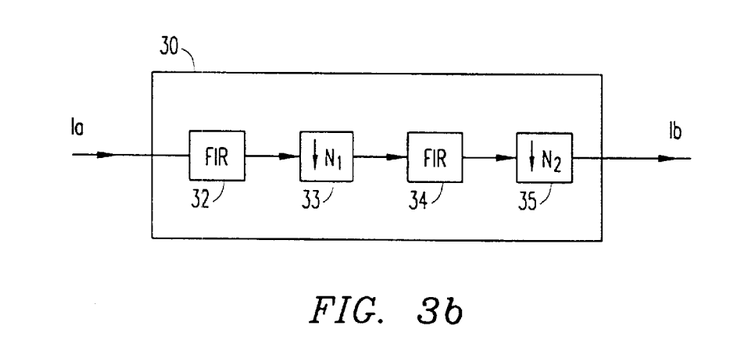

One possible implementation of the filtering function block 30 is demonstrated in FIG. 3b. The signal $I_a$ is fed to a first finite impulse response (FIR) filter 32. After filtering, the signal is decimated a factor $N_1$ in a decimation block 33. The signal is then passed to a second FIR filter 34 and finally decimated a factor $N_2$ in a decimation block 35.

Figure 3C:
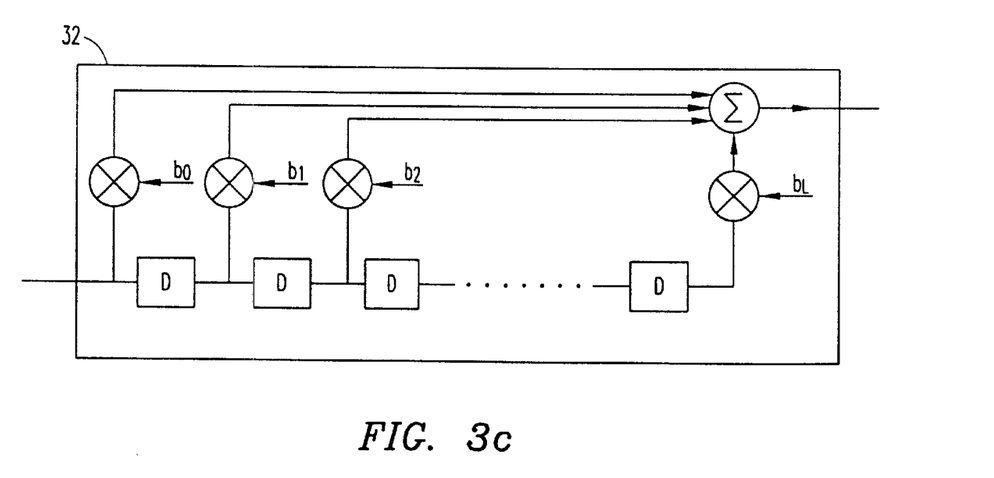

FIG. 3c includes an example of how the first FIR filter 32 can be implemented. Assuming a length L filter, there are L delay elements (boxes marked with D in the figure) and L+1 filter coefficients $b_0, b_1, \ldots, b_L$. The length L of the first FIR filter 32 and the filter coefficients $b_0, b_1, \ldots, b_L$ determine the filter function of the first FIR filter 32. There are numerous text books on how to choose both the filter length L and the filter coefficients $b_0, b_1, \ldots, b_L$ to obtain a certain filter function, and we refer to "Digital Filter Design"by T. W. Parks and C. S. Burrus, John Wiley & Sons, Inc., 1987 as an example. It is also possible to choose other filter structures than FIR filters. The above reference gives several examples of different structures apart from FIR that could be used to implement the filter function.

The two FIR filters 32 and 34 together perform the channel filtering needed for GSM1900. The decimation factors are chosen as $N_1$=12 and $N_2$=4. The total decimation factor is 12·4=48, which reduces the sampling rate from 13 MHz at the input $I_a$ to 270,833 kHz at the output $I_b$. 270,833 kHz equals the symbol rate in GSM1900 and is a convenient sampling rate for the data recovery unit 29 in FIG. 2.

An alternative embodiment of the invention is described below in association with the previous embodiment and FIG. 4.

In this embodiment it is assumed that two different cellular networks are being used by the multi-mode phone m, and the cellular networks have very different requirements on the channel bandwidth at baseband. The invention according to this embodiment can of course also be implemented in a multi-mode phone that is operating in more than two cellular networks.

When switching between the cellular networks used by the multimode phone m, the receiver arrangement 1 is adapted to the new cellular network according to this embodiment by changing the sampling frequency $f_s$ that controls the digital filter unit 25 in the digital part of the receiver, as described in the previous embodiment.

As the requirements on the channel bandwidth at baseband are very different for the two cellular networks to be used by the multi-mode phone m, it is impractical to only use a change of the sample frequency $f_s$ to alter the bandwidth of the digital filter unit 25. By allowing some of the filter parameters in the digital filter unit 25 to change, the filter function of the digital filter unit 25 can more easily be adjusted to the requirements of the different cellular networks.

An example in association to this embodiment is described below.

It is assumed in this example that the receiver in the multi-mode phone m is a combined GSM1900 and IS-95 receiver.

Both the GSM1900 mobile receiver and the IS-95 mobile receiver operate in the 1900 MHz frequency band between 1930 and 1990 MHz. The requirements for the GSM1900 is to have a 90 kHz channel bandwidth at baseband and the requirements for the IS-95 mobile receiver is to have about 0.6 MHz channel bandwidth at baseband.

As the networks GSM1900 and IS-95 operate in the same frequency band, the analog part of the receiver only comprise one front-end part, as shown in FIG. 4, for example the first front-end part 5 described above. The receiver is of a heterodyne structure as described above, but the invention works as well for a receiver of a homodyne structure as in the previous embodiments.

In this example it is also assumed that the receiver is designed to handle the cellular network GSM1900, and that for this mode the digital filter unit 25 is implemented with the same structure as depicted in FIG. 3a, 3b, 3c.

The sampling frequency $f_s$ equals 13 MHz. The channel filtering in the digital filter unit 25 is done using the two FIR filters 32, 34 with intermediate sample rate decimations with factors $N_1$=12 and $N_2$=4. This brings down the sample rate to 13 MHz/(12*4)≈270,833 kHz at the output of the digital filter unit 25, as described in the previous example. The total channel bandwidth of the digital filter unit 25 at baseband is 90 kHz as in the previous example.

The intermediate bandpass filter 15 has, in this embodiment, much wider bandwidth than in the previous example. It has to pass the 1.23 MHz wide channels of IS-95. The bandpass filter 15 in the intermediate frequency part 9 therefore contributes less to the total channel filtering in the receiver arrangement 1 than in the previous example, and more of the filtering has to be done in the digital filter unit 25.

The same structure as in FIGS. 3a, 3b, 3c can still be used, but the filter coefficients $b_0, b_1, \ldots, b_L$ (and possibly the length L) of the two FIR filters 32, 34 inside the digital filter unit 25 have to be changed. A change of one or both FIR filters 32, 34 to IIR-filters (infinite impulse response filter) can also be done but this is not described here.

Now it is assumed that the multi-mode phone m is to be used in the cellular network IS-95. This is illustrated in FIG. 4.

The antenna 2 in FIG. 4, according to the above described embodiment, receives the incoming signal S containing different frequencies, and the first front-end part 5 cuts off all the frequencies outside the frequency band corresponding to the IS-95 mobile receive band, which is 1930–1990 MHz.

The filtered signal $S_1$ from the first front-end part 5 is received in the intermediate frequency part 9 and is further delivered into the first mixer 12. The first mixer 12 then mixes this signal with the local oscillator signal, designated $S_c$ in FIG. 4, wherein the first mixer 12 generates the signal $S_c$ in an intermediate frequency band.

The bandpass filter 15 in the intermediate frequency part 9 cuts off all the intermediate frequencies in the signal $S_3$ from the first mixer 12 except for the intermediate frequencies in a wanted second frequency band.

Thereafter the I/Q-demodulator 11 receives the signal in the second frequency band, and the I/Q-demodulator 11 then generates an IS-95 baseband signal I on the first output 16a and an IS-95 baseband signal Q on the second output 16b.

The signals I and Q from the I/Q-demodulation are further filtered in the separate analog filters 17, 19 and after the analog filters 17, 19 the signals are each digitally converted into the signals $I_a$ and $Q_a$ in the separate A/D-converters 21, 23 at the sampling frequency fs, as shown in FIG. 4.

Thereafter the signals $I_a$ and $Q_{ao}$ are treated in the digital filter unit 25. One way of handling the digital filter unit 25 would be to change the sampling frequency $f_s$ and scale the bandwidth of the digital filter unit 25 just as in the previous example. This would require an sampling frequency $f_s$ equal to 13 MHz*0.6 MHz/90 kHz=86.67 MHz. This choice is impractical. Firstly, the frequency is high and leads to unnecessary fast signal processing in the digital filter unit 25, and, secondly, it would be beneficial to have a sample rate that is a multiple of the chip rate 1.2288 MHz in IS-95.

Instead we choose to change the sampling frequency $f_s$ to match a factor of the IS-95 chip rate. The sampling frequency $f_s$ is changed from 13 MHz to 12·1.2288 MHz= 14.7456 MHz in the IS-95 mode. In this example the sampling frequency $f_s$ is generated by using a phased locked loop (PLL) 22. The PLL generates an output frequency based on a fixed reference frequency of the oscillator 24. The control circuit 28 defines the output frequency of the PLL by controlling the internal PLL divider factors. This structure is well known to someone skilled in the art.

The digital filter unit 25 is implemented using the same basic structure as in FIG. 3a, 3b, 3c. The decimation factors are changed to $N_1$=3 and $N_2$=1. This leads to an output sample rate from the digital filter unit 25 at 14.7456 MHz/ (3*1) ≈4.9152 MHz, which equals four samples per chip period.

The first FIR filter 32 can be kept unchanged. It was designed in the GSM1900 case to handle a decimation factor $N_1$=12 in the decimation block 33 without passing signals that would lead to harmful aliasing, and therefore having a smaller $N_1$, as in the IS-95 case, will not be a problem.

In a filter structure as in FIGS. 3a, 3b, 3c it is the second FIR filter 34 that determines the total bandwidth of the digital filter unit 25. In the GSM1900 case this bandwidth is 90 kHz. The change of the sampling frequency and $f_s$ and the decimation factor $N_1$ alters this bandwidth to 90 kHz·14.7456/13·12/3≈408 kHz. This is a too narrow band compared to the 0.6 MHz bandwidth of IS-95 at baseband. The decimation factor $N_2$ affects the signal after it has passed the FIR-filters 32, 34 wherein this factor $N_2$ doesn't alter the bandwidth of the digital filter unit 25.

An alternative second FIR filter 34 is thus needed. This can be achieved rather easily by allowing two sets of filter parameters (i.e. filter coefficients $b_0, b_1, \ldots, b_L$ and possibly the length L) in the second FIR filter 34 in the digital filter unit 25. The first set corresponds to the bandwidth required for GSM1900, while the second set corresponds to the bandwidth required for IS-95. Changing between the two sets of filter parameters in the second FIR filter 34 is done at the same time as the multi-mode phone m switches between in this case the networks GSM1900 and IS-95.

The same basic digital filter unit 25 is used for both the GSM1900 and the IS-95 mode. The only difference is a change in the decimation factors $N_1$, $N_2$ in the decimation blocks 33, 35 of FIG. 3b and switch of filter parameters in the second FIR filter 34. In both cases the digital filter unit 25 filters the signals so that the frequencies outside the required channel bandwidth at baseband of GSM1900 and IS-951 respectively, are blocked.

In the IS-95 case, two channel signals $I_b$ and $Q_b$ in quadrature are thereby generated on the two outputs 27a, 27b of the digital filter unit 25. The two channel signals $I_b$ and $Q_b$ contain frequencies from zero up to 0.6 MHz, which corresponds to the wanted channel bandwidth at baseband for the network IS-95.

After the digital filter unit 25 the two channel signals $I_b$ and $Q_b$ are passed on to the data recovery unit 29, wherein relevant information from the channel signals $I_b$ and $Q_b$ are reconstructed.

It is possible to use separate oscillators for controlling the A/D-converters 21, 23 and the digital filter unit 25 in the above described embodiments as long as the A/D-converters 21, 23 are synchronized with the digital filter unit 25. For simplicity the same oscillator 24 is used to control the A/D-converters 21, 23 and the digital filter unit 25 in the above examples.

The digital filter unit 25 in the above described embodiments can either be implemented as separate digital filters, wherein each one of the A/D-converters 21, 23 are connected to separate digital filters, or as one filter unit being multiplexed between the two signal flows.

In the embodiments above we have used FIR filters, with interlaced decimation units. This should be seen as an example. There are many other filter structures that could have been used instead to implement the filter function. This is obvious to someone skilled in the art, and a change of filter structure should be seen as included in the overall idea of what has been presented above.

The analog parts of the receiver, except for the front-end parts 5, 7, in the above described embodiments, are not limited to comprise the above described components. As an example the intermediate frequency part 9 can be made separate for the different cellular networks used by the phone. The I/Q-demodulator 11 does not necessarily have to be a common component for the two different cellular networks either. More modifications of the analog part are possible to be used.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. A radio receiver for receiving signals within at least one frequency band, said signals corresponding to at least a first and a second network, wherein each of said at least first and second networks have different channel bandwidths, said radio receiver being operable within each of said at least first and second networks, comprising:

at least one digital filter unit within a digital part of said radio receiver, said at least one digital filter unit receiving input data sampled at a sampling frequency related to a first bandwidth of said at least one digital filter unit, said first bandwidth corresponding to the bandwidth of said first network; and a frequency modifying device for changing said sampling frequency by a first factor when said radio receiver is switched to operate in said second network, said at least one digital filter unit processing a second bandwidth corresponding to said second network.

2. The radio receiver according to claim 1, wherein said first factor is equal to a required channel bandwidth at baseband of said second network divided by a required channel bandwidth at baseband of said first network.

3. The radio receiver according to claim 1, wherein said at least one digital filter unit comprises at least one filter function block, said at least one digital filter unit processing said second bandwidth by altering both said sampling frequency and said at least one filter function block when said radio receiver is switched to operate in said second network.

4. The radio receiver according to claim 3, wherein said at least one filter function block comprises at least one decimation block, said at least one digital filter unit altering said at least one filter function block when said radio receiver is switched to operate in said second network by changing a decimation factor of said at least one decimation block.

5. The radio receiver according to claim 3, wherein said at least one filter function block comprises at least one filter part, said at least one digital filter unit altering said at least one filter function block when said radio receiver is switched to operate in said second network by changing a structure of said at least one filter part.

6. The radio receiver according to claim 5, wherein said at least one filter part comprises a plurality of filter parameters for determining said structure of said at least one filter part, said at least one digital filter unit changing said structure of said at least one filter part by changing at least one of said plurality of filter parameters.

7. The radio receiver according to claim 6, wherein said at least one filter part is a finite impulse response (FIR) filter with a length (L) and said plurality of filter parameters in said at least one filter part comprises said length (L) and filter coefficients ($b_0, b_1, \ldots, b_L$).

8. The radio receiver according to claim 5, wherein said at least one filter part comprises at least two sets of filter parameters for determining said structure of said at least one filter part, each set of said at least two sets of filter parameters corresponding to one of said at least first and second networks being used by said radio receiver, said at least one digital filter unit changing said structure of said at least one filter part by changing to the set of at least two sets of filter parameters corresponding to said second network.

9. The radio receiver according to claim 1, wherein said frequency modifying device for changing said sampling frequency comprises a divider connected to a crystal oscillator with a fixed frequency.

10. The radio receiver according to claim 1, wherein said frequency modifying device for changing said sampling frequency comprises a phased locked loop connected to a crystal oscillator with a fixed frequency, said phased locked loop having at least two divider factors.

11. The radio receiver according to claim 1, wherein said frequency modifying device for changing the sampling frequency comprises:

at least two oscillators having fixed frequencies; and a switch for switching between said at least two oscillators.

12. The radio receiver according to claim 1, wherein said radio receiver is installed and functioning within a mobile radio.

13. A method for changing a channel bandwidth in a radio receiver operating in at least one frequency band corresponding to at least a first and a second network, said radio receiver operable in each of said at least first and second networks, comprising the steps of:

receiving at a digital filter unit input data sampled at a sampling frequency related to a first bandwidth of said digital filter unit when said radio receiver is used in said first network;

changing said sampling frequency by a first factor when said radio receiver is switched to operate in said second network; and processing a second bandwidth in said digital filter unit in accordance with the changed sampling frequency.

14. The method according to claim 13, wherein the step of processing said second bandwidth further comprises the step of altering at least one filter function block within said digital filter unit when said radio receiver operates in said second network.

15. The method according to claim 14, wherein the step of altering said at least one filter function block further comprises the step of changing a decimation factor in at least one decimation block within said at least one filter function block.

16. The method according to claim 14, wherein the step of altering said at least one filter function block further comprises the step of changing a structure of at least one filter part within said at least one filter function block.

17. The method according to claim 16, wherein the step of changing said structure of said at least one filter part comprises changing at least one of a plurality of filter parameters within said at least one filter part, said at least one of said plurality of filter parameters determining a function of said at least one filter part.

18. The method according to claim 16, wherein the step of changing said structure of said at least one filter part comprises changing to a set of filter parameters corresponding to said second network, said at least one filter part having at least two sets of filter parameters, each of said at least two sets of filter parameters corresponding to one of said at least first and second networks being used by said radio receiver.

19. The method according to claim 13, wherein the step of changing said sampling frequency comprises adjusting a divider connected to a crystal oscillator having a fixed frequency.

20. The method according to claim 13, wherein the step of changing said sampling frequency comprises adjusting a divider factor of a phased locked loop connected to a crystal oscillator having a fixed frequency.

21. The method according to claim 13, wherein the step of changing said sampling frequency comprises switching between at least two oscillators, each of said at least two oscillators having a fixed frequency.

* * * * *

UNITED STATES PATENT AND TRADEMARK OFFICE
CERTIFICATE OF CORRECTION

PATENT NO. : 6,385,262 B1
DATED : May 7, 2002
INVENTOR(S) : Gustafsson et al.

It is certified that error appears in the above-identified patent and that said Letters Patent is hereby corrected as shown below:

Drawings,
Figure 4, replace "Receiver Front-end 7" with -- Receiver Front-end 5 --

Column 4,
Line 30, add -- Figure 2b is an exemplary block schematic illustrating an alternative implementation for controlling a sampling frequency according to the invention. --

Signed and Sealed this

Fourth Day of February, 2003

JAMES E. ROGAN
*Director of the United States Patent and Trademark Office*